United States Patent [19]

French

[11] Patent Number: 5,291,646
[45] Date of Patent: Mar. 8, 1994

[54] CLIP FOR ATTACHING A FLY TYER'S VISE TO A STEERING WHEEL OR OTHER SUITABLE STRUCTURE (THE "EZ CLIP")

[76] Inventor: Stephen J. French, P.O. Box 3637, Moscow, Id. 83843

[21] Appl. No.: 921,517

[22] Filed: Jul. 29, 1992

[51] Int. Cl.$^5$ .............................................. A01K 97/28
[52] U.S. Cl. ....................................... 29/515; 29/450; 29/453
[58] Field of Search ................. 248/231.7, 231.8; 43/4; 29/505, 515, 450, 453; 269/97

[56] References Cited

U.S. PATENT DOCUMENTS

| | | | |
|---|---|---|---|
| 1,265,287 | 5/1918 | Aufuldish | 248/231.7 |
| 1,375,888 | 4/1921 | Baer | 248/296 |
| 1,537,039 | 5/1925 | Short | 248/231.8 |
| 1,716,806 | 6/1929 | Villatore et al. | 248/231.7 |
| 2,145,838 | 1/1939 | Sakier | 248/231.7 |
| 3,803,742 | 4/1974 | Foster | 43/4 |
| 4,159,816 | 7/1979 | Miyamae | 248/231.7 |

FOREIGN PATENT DOCUMENTS

| | | | |
|---|---|---|---|
| 865704 | 6/1962 | France | 248/231.8 |
| 840556 | 7/1960 | United Kingdom | 248/231.8 |

Primary Examiner—Hien H. Phan

[57] ABSTRACT

The subject invention relates generally to devices for facilitating the temporary attachment of objects to a steering wheel and has particular reference to a device for removably attaching a fly tyer's vise to a steering wheel or other suitable structure. The preferred embodiment consists of a flat strip of metal bent into the shape of a "U" or a "V" and treated so as to achieve a non-skid, protective surface. Several rubber "spacers" may accompany the device for adaptation to structures smaller in diameter than the standard boat or automobile steering wheel; the device sides may also be indented or expanded to obtain a more secure fit. The device is sufficiently wide to accommodate an optional variety holes and notches for holding fly tying equipment. A piece of impressionable, foam rubber-like material can be attached to the device for stowing completed flies. The device is slipped around a steering wheel, open end facing out. A standard fly tyer's vise can then be attached to the steering wheel by tightening the vise grips around the exposed ends of the device. The device should be of sufficient length such that a fly tyer's vise attached to the lower portion of a steering wheel does not encounter the upper portion of said steering wheel.

4 Claims, 4 Drawing Sheets

CLIP FOR ATTACHING A FLY TYER'S VISE TO A STEERING WHEEL OR OTHER SUITABLE STRUCTURE (THE "EZ CLIP")

BACKGROUND

Fly fishing is a popular American pastime and the associated typing of fishing flies has risen to the level of an art. Tying flies requires a variety of materials and tools. Perhaps the most essential of them is the fly tyer's vise, exemplified by Gautam, Nov. 13, 1990, U.S. Pat. No. 4,969,636, and Doiron, Mar. 30, 1982, U.S. Pat. No. 4,322,065. While the invention of the fly tyer's vise greatly simplified tying flies, fly tying vises are generally cumbersome and require a stable, table top-like structure to which the vise can grip. Such structures are often not readily available on fishing trips when many fisherman prefer to tie flies. The subject invention allows fishermen to use a fly tyer's vise in the convenience of a boat or car with easy access to all necessary equipment and unrestricted use of both hands. Attaching a fly tyer's vise to a steering wheel without the EZ Clip is difficult due to the dimensions of the standard vise and the incompatibility between the flat vise grip surfaces and the rounded or contoured edges of a steering wheel.

A variety of inventions intended for attachment to steering wheels are known in prior art:

1) Sweder, Apr. 17, 1990, U.S. Pat. No. 4,917,130, discloses a make-up compact for mounting on a steering wheel. This device incorporates Velcro fasteners with a resilient, U-shaped spring clip as a means of attachment;
2) White, Feb. 23, 1988, U.S. Pat. No. 4,726,607, features a clipboard for attachment to an automobile steering wheel. The clipboard is affixed to a steering wheel with a flexible hook and Velcro attachment strap;
3) R. W. Thompson, Jan. 31, 1956, U.S. Pat. No. 2,732,642, reveals a metal frame map holder attached to the center of a steering wheel with integrated hooks and springs;
4) V. A. Burrows, Jun. 7, 1955, U.S. Pat. No. 2,710,138, introduced a coin holder secured to a steering wheel by tightening a bolt through the U-shaped base of the device;
5) W. G. Hollingsworth, Jun. 1, 1937, U.S. Pat. No. 2,082,246, offers a smoker's receptacle, employing a metal ring with flanges and screws for steering wheel attachment;
6) P. M. Manion, Dec. 8, 1953, U.S. Pat. No. 2,661,747, presents a map retaining and displaying device for an automobile steering wheel. The device is secured by a spring clamp and bolt with a wing-nut;
7) A. E. Seinecke, Jun. 22, 1926, U.S. Pat. No. 1,589,572, discloses a steering wheel-mounted holder for pipes, cigars, or other objects. The holder is fixed to the steering wheel by way of a metal bracket and screws. The bracket is intended to be installed permanently, while the actual holder can be removed; and
8) A. S. Wells, Feb. 26, 1924, U.S. Pat. No. 1,485,102, presents a match receptacle designed for attachment to a steering wheel by way of a clamp and bolt apparatus.

While the above mentioned devices are well-suited for their intended use, none disclose a removable clip for quickly and firmly attaching a fly tyer's vise to a steering wheel or other structure with similar dimensions. The EZ Clip is inexpensive, portable, effective, and easy to use.

SUMMARY

The subject invention presents a lightweight, portable device for quickly and firmly attaching a standard fly tyer's vise to a steering wheel or other structure with appropriate dimensions (said invention hereinafter referred to as a "clip").

The subject device is a flat strip of metal, or other sufficiently malleable and strong material, bent into the shape of a "U" or a "V" (said location hereinafter referred to as the "bend") and coated with a non-skid substance (such as "Plasti-Dip"), or the surface otherwise treated so as to: a) prevent slippage between the clip and a steering wheel (or other structure of suitable dimensions), b) prevent the clip from scratching the structure to which it is attached, and c) retain the grip of a fly tyer's vise to the clip. Several rubber "spacers" of various shapes and sizes may accompany the clip to adapt the device to structures smaller in diameter than the standard boat or automobile steering wheel; the clip sides or "arms" may also be indented to expanded to obtain a more secure fit. The clip should be of sufficient width to accommodate and optional variety of holes and notches for holding fly typing equipment; a small piece of impressionable, foam rubber-like material can be attached to the clip for stowing completed flies. The device is slipped around a steering wheel, or other structure with appropriate dimensions, open end facing out. A standard fly tyer's vise can then be attached to the clip by tightening the vise grips around the exposed ends of the device. The clip should be of sufficient length such that a fly tyer's vise attached by said clip to the lower portion of a steering wheel does not encounter the upper portion of said steering wheel.

A possible variation of the subject device is exemplified by the clip separated at the bend with an added means for attaching one arm of the clip to each "jaw" of a fly tyer's vise. The fly tyer's vise may then be attached to a steering wheel or other suitable structure by tightening the vise grips, and thereby the arms of the modified clip, around said structure.

There has thus been outlined, rather broadly, the more important features of this invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components as set forth in the following description or illustrated in the drawings. The invention is capable of other embodiments and of being practiced and carried out in various ways. It is to be understood that the phraseology and terminology employed herein are for the purpose of description and should not be regarded as limiting. As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office, the public generally, and especially the scientists, engineers, and practitioners in the art who are not familiar with patent or legal terms and phraseology, to determine quickly from a cursory inspection, the nature and essence of the technical disclosure of the application. The abstract is neither intended to define the invention of the application, which is measured by the claims, nor is it intended to be limiting as to the scope of the invention in any way.

It is therefore an object of the present invention to provide a means for quickly and easily securing a fly tyer's vise to a steering wheel or other structure with appropriate dimensions.

Additional objectives of the present invention include: providing such a device which may be easily and efficiently manufactured and marketed; providing such a device of durable and reliable construction; providing such a device which is susceptible of a low cost of manufacture with regard to both materials and labor, accordingly making the subject invention economically available to the buying public; and providing such a device enabling fast, convenient installation and removal.

These together with other objects of the invention, along with the various features of novelty which characterize the invention, are specified in the claims annexed to and forming part of this disclosure. For a better understanding of the invention, it advantages and the specified objects attained by its uses, reference should be made to the accompanying drawings and descriptive matter in which there are illustrated preferred embodiments of the invention.

Figure 1:
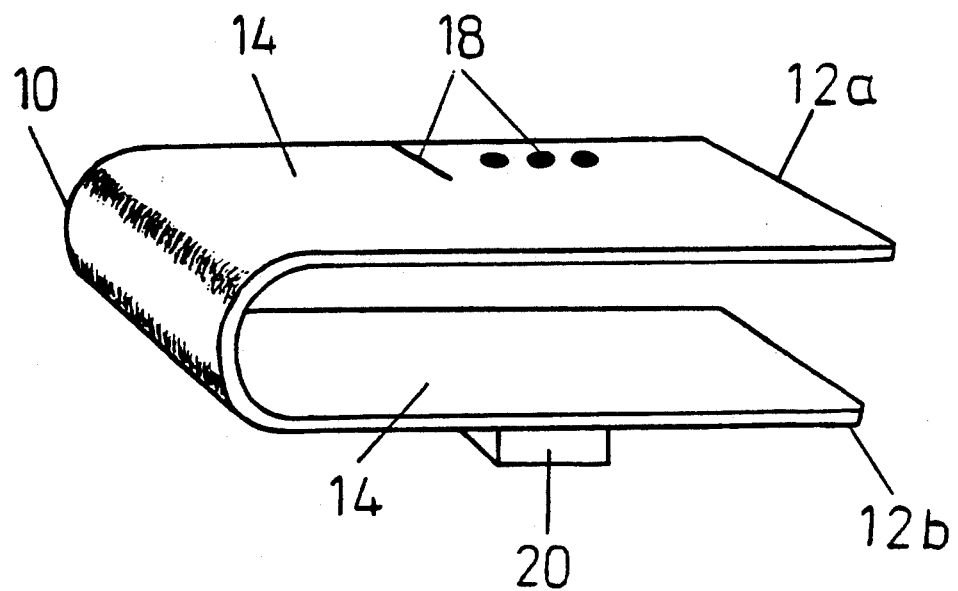
FIG. 1 is a perspective view of the present device with a U-shaped bend, straight arms, a variety of notches and holes in one arm, with a foam rubber pad attached to the opposite arm.
Figure 2:
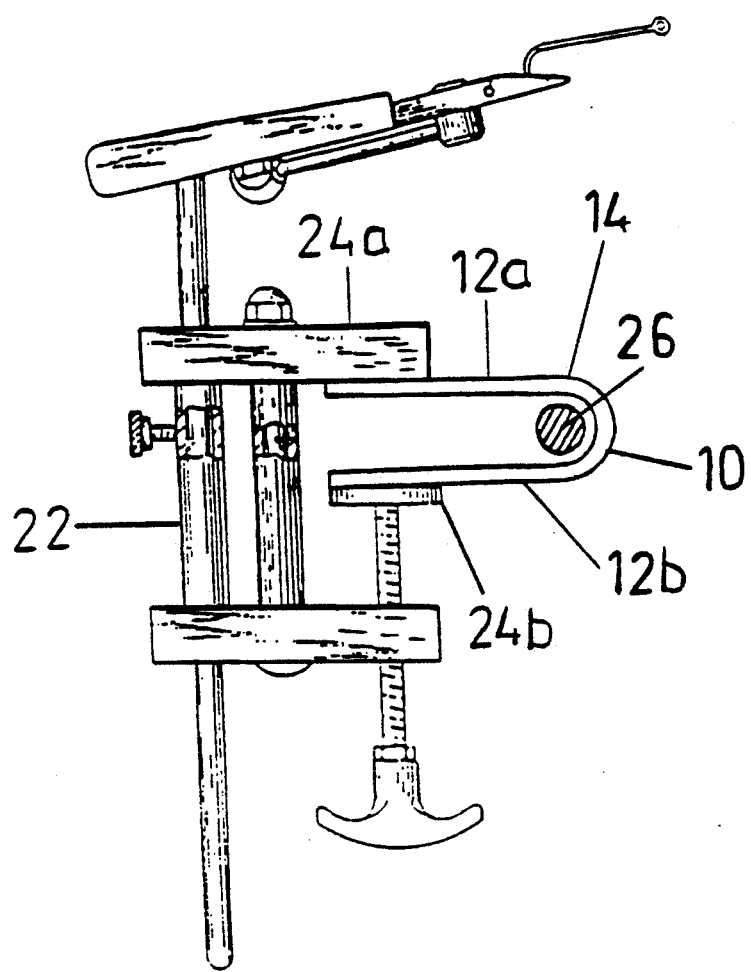
FIG. 2 is a side view of the present device with a U-shaped bend and straight arms. The device is depicted as if in use around a steering wheel with a fly tyer's vise attached.
Figure 3:
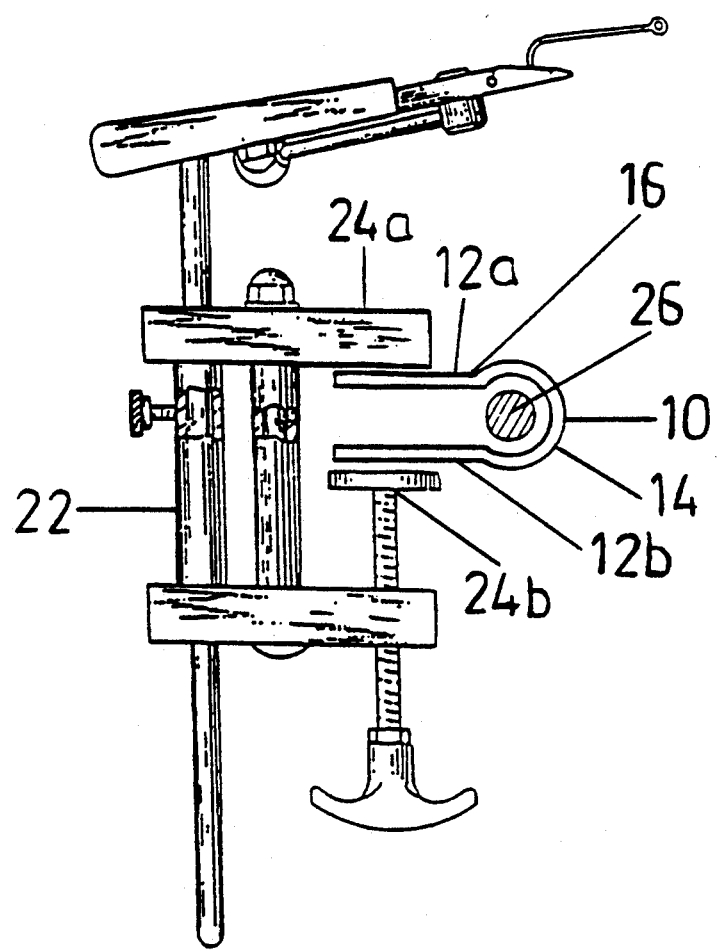
FIG. 3 is a side view of the present device with a U-shaped bend and contoured arms. The device is depicted as if in use around a steering wheel with a fly tyer's vise attached.
Figure 4:
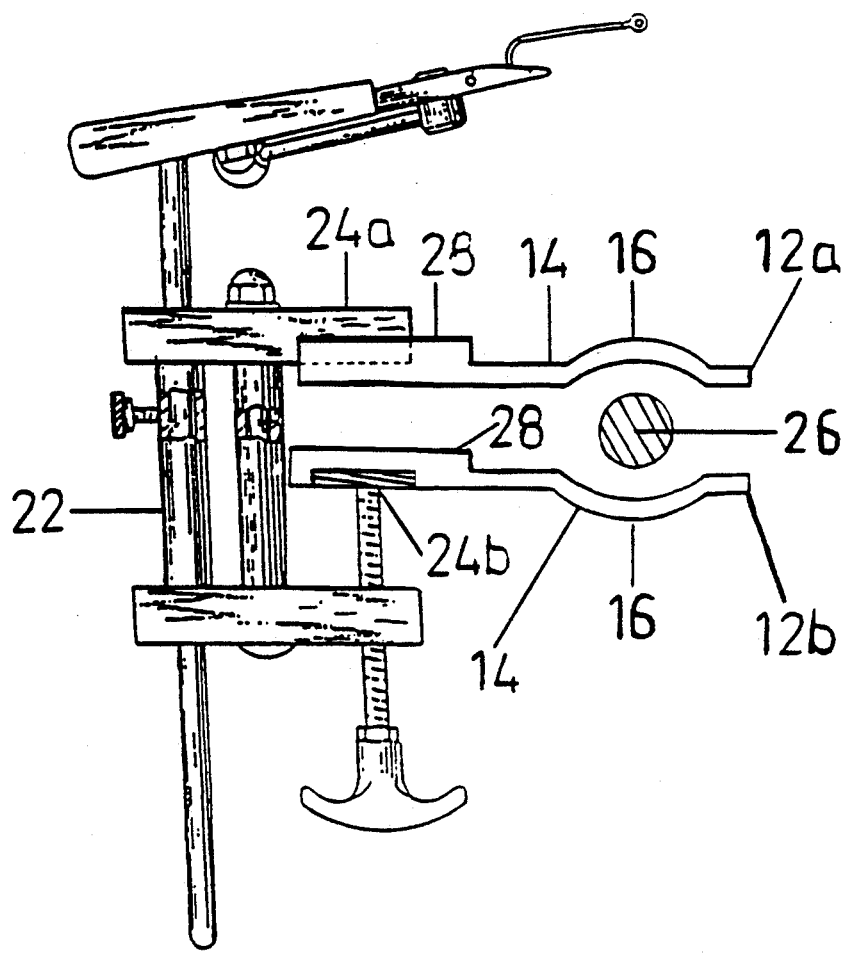
FIG. 4 is a side view of the present device, separated at the bend and employing contoured arms that are attached to the jaws of a fly tyer's vise.

| REFERENCE NUMERALS IN DRAWINGS | |
|---|---|
| Reference No. | Description of Part |
| (10) | "U" "V"-shaped bend in clip |
| (12a and b) | arms of the clip |
| (14) | surface treatment |
| (16) | contours in arms of clip |
| (18) | holes and notches in arm of clip |
| (20) | foam rubber-like material |
| (22) | fly tyer's vise |
| (24a and b) | fly tyer's vise "jaws" or "grips" |
| (26) | steering wheel or similar structure |

-continued

| REFERENCE NUMERALS IN DRAWINGS | |
|---|---|
| Reference No. | Description of Part |
| (28) | means for attaching modified clip to vise jaws |

DETAILED DESCRIPTION OF INVENTION

Referring to the drawings, the device of the present invention comprises: a flat strip of metal, or other sufficiently malleable and strong material, bent into the shape of a "U" or a "V" (10) (said location hereinafter referred to as the "bend"), and so forming two "arms" (12a) and (12b). A non-skid substance is applied to the device (14), or the surface otherwise treated so as to: a) prevent slippage between the clip and a steering wheel (or other structure of suitable dimensions (26)), b) prevent the clip from scratching the structure (26) to which it is attached, and c) retain the grip of a fly tyer's vise (22) to the clip.

Optional contours in the arms of the clip (16) for achieving a more secure fit are illustrated in FIGS. (3) and (4).

A variety of holes and notches for holding fly tying equipment are displayed in FIG. 1 at (18); a small piece of impressionable, foam rubber-like material attached to the clip for stowing completed flies is shown in FIG. 1 at (20).

A fly tyer's vise (22) with grips (24a) and (24b) attached to a steering wheel-type structure (26) by the clip are represented in FIGS. (2), (3), and (4).

The present invention is slipped around a steering wheel, or other structure with appropriate dimensions (26), open end facing out. A standard fly tyer's vise (22) can then be attached to the clip by tightening the vise grips (24a) and (24b) around the exposed arms of the device (12a) and (12b). The clip should be of sufficient length such that a fly tyer's vise (22) attached by said clip to the lower portion of a steering wheel does not encounter the upper portion of said steering wheel.

A possible variation of the subject device is exemplified in FIG. (4), wherein the clip is separated at the bend (10) with an added means for attaching (28) one arm of the clip, (12a) and (12b), to each "jaw" of a fly tyer's vise (24a) and (24b). The fly tyer's vise (22) may then be attached to a steering wheel or other suitable structure (26) by tightening the vise grips (24a) and (24b), and thereby the affixed arms (12a) and (12b) of the modified clip, around the structure (26).

The embodiments of the invention in which particular property or privilege is claimed are defined as follows:

1. A method of removably attaching a fly tyer's vise to an outer circumferential surface of a substantially cylindrical support comprising:
   a) providing a U-shaped mounting member; the U-shaped member being made of a relatively strong flat strip of metal and having two arms connected to each other by a connecting portion;
   b) mounting the U-shaped member to a substantially cylindrical support by sliding the member over an outer surface of the support with an inner surface of the connecting portion abutting the outer surface of the support;
   c) providing a fly tyer's vise having two movable clamp jaws;

d) mounting the fly tyer's vise to the support by clamping the arms of the U-shaped member with the clamp jaws to cause the U-shape member to deform and firmly grip the support to prevent relative movement therebetween and, thereby, securing the fly tyer's vise to the support.

2. The method of mounting a fly tyer's vise in accordance with claim 1, further including:

providing the U-shaped member with a layer of material on the inner surface thereof to prevent the U-shaped member from slipping relative to the support.

3. The method of mounting a fly tyer's vise in accordance with claim 1, wherein the support being a steering wheel of a vehicle.

4. The method of mounting a fly tyer's vise according to claim 1, further comprising:

providing at least one opening in at least one of the arms of the U-shaped member to provide the arms with clamping faces complementing with faces of the clamp jaws.

* * * * *